United States Patent
Sim (10) Patent No.: US 12,240,072 B2
(45) Date of Patent: Mar. 4, 2025

(54) DETECTION APPARATUS AND DETECTION METHOD FOR MACHINE TOOL ABNORMALITY

(71) Applicant: DN SOLUTIONS CO., LTD., Changwon-si (KR)

(72) Inventor: Jaedoo Sim, Gimhae-Si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 1106 days.

(21) Appl. No.: 16/960,042

(22) PCT Filed: Jan. 2, 2019

(86) PCT No.: PCT/KR2019/000035
§ 371 (c)(1),
(2) Date: Oct. 23, 2020

(87) PCT Pub. No.: WO2019/135596
PCT Pub. Date: Jul. 11, 2019

(65) Prior Publication Data
US 2021/0053170 A1    Feb. 25, 2021

(30) Foreign Application Priority Data

Jan. 3, 2018 (KR) ......................... 10-2018-0000513

(51) Int. Cl.
*B23Q 17/09* (2006.01)
*G01L 5/00* (2006.01)
*G05B 19/4065* (2006.01)

(52) U.S. Cl.
CPC ............ *B23Q 17/09* (2013.01); *G01L 5/0028* (2013.01); *G05B 19/4065* (2013.01); *G05B 2219/49001* (2013.01)

(58) Field of Classification Search
CPC ............... B23Q 17/09; B23Q 17/0961; B23Q 17/0957; B23Q 17/0966; G01L 15/0028;
(Continued)

(56) References Cited

U.S. PATENT DOCUMENTS 5,631,851 A * 5/1997 Tanaka ............... G05B 19/4062
702/33
2019/0196458 A1* 6/2019 Wei ........................ G06N 5/022

FOREIGN PATENT DOCUMENTS

CN    106574863 A * 4/2017    ............. G01H 11/06
JP    H05116056 A * 5/1993
(Continued)

OTHER PUBLICATIONS

International Search Report of PCT/KR2019/000035, Mar. 27, 2019, English translation.

*Primary Examiner* — Catherine T. Rastovski
*Assistant Examiner* — Yossef Korang-Beheshti
(74) *Attorney, Agent, or Firm* — STIP Law Group, LLC (57) ABSTRACT

The present disclosure relates to an apparatus and a method for detecting an abnormality of a tool of a machine tool, and more particularly, to an apparatus and a method for correcting backlash of a machine tool, which are capable of repeatedly measuring a load of a workpiece transferring unit or a workpiece machining unit, and automatically detecting an abnormality of a tool based on a normal range of load data that are proportional to a standard deviation of the load data measured based on any one of a mode value, a mean value, or a median value of the repeatedly measured load data.

8 Claims, 6 Drawing Sheets

(58) Field of Classification Search
CPC ...... G05B 19/4065; G05B 2219/37245; G05B 2219/50203; G05B 2219/50205; G05B 2219/50276

See application file for complete search history.

(56) References Cited

FOREIGN PATENT DOCUMENTS

| | | |
|---|---|---|
| JP | H07132440 A | 5/1995 |
| JP | 4441735 B2 | 3/2010 |
| KR | 1020040083912 A | 10/2004 |
| KR | 101787347 B1 | 10/2017 |

* cited by examiner

DETECTION APPARATUS AND DETECTION METHOD FOR MACHINE TOOL ABNORMALITY

CROSS-REFERENCE TO RELATED APPLICATIONS

This application is the U.S. National Phase under 35 U.S.C. § 371 of International Application No. PCT/KR2019/000035 filed on Jan. 2, 2019, which in turn claims the benefit of Korean Application No. 10-2018-0000513, filed on Jan. 3, 2018, the disclosures of which are incorporated by reference into the present application.

TECHNICAL FIELD OF THE DISCLOSURE

The present disclosure relates to an apparatus and a method for detecting an abnormality of a tool of a machine tool, and more particularly, to an apparatus and a method for detecting an abnormality of a tool of a machine tool, which are capable of repeatedly measuring a load of a workpiece transferring unit or a workpiece machining unit and automatically detecting the presence or absence of an abnormality of a tool based on a normal range of load data that are proportional to a standard deviation of the load data measured based on a mode value of the repeatedly measured load data.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, and a CNC lathe are being widely used to suit the purpose of the corresponding work in various industrial sites.

In general, various types of currently used machine tools each have a control panel to which a numerical control (NC) technology or a computerized numerical control (CNC) technology is applied. The control panel is provided with a multifunctional switch or button, and a monitor.

Further, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during the machining process.

In general, the machine tool is provided with a transfer unit configured to transfer the table, a tool post, the main shaft, the tailstock, and the steady rest along a transfer shaft in order to perform various types of machining.

Further, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

Further, the machine tool is equipped with the automatic tool changer (ATC) configured to withdraw a specific tool from the tool magazine or remount the tool on the tool magazine based on an instruction of a numerical control unit in order to improve productivity of the machine tool.

In addition, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

The tools used for the machine tool in the related art are damaged when an excessive load is applied to the tools. When the tool is broken or damaged, the machining precision deteriorates, and in severe cases, even the main shaft is damaged, which causes an increase in maintenance costs because the machine tool itself needs to be replaced. Further, productivity deteriorates because the damaged tool is replaced, and waste of damaged workpieces is caused.

Therefore, during a machining process, an operator needs to consistently check for whether the tool is damaged.

Figure 1:
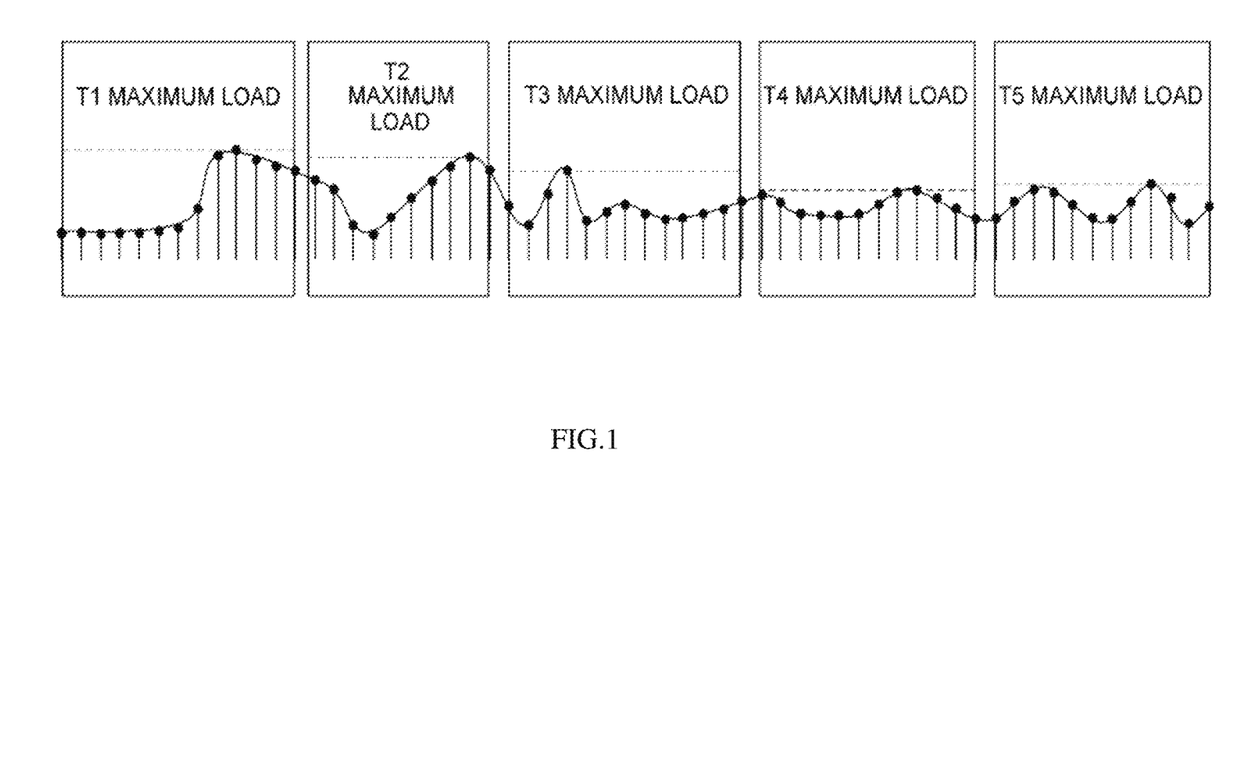
FIG. 1 is a graph for explaining determination of the presence or absence of an abnormality of a tool in accordance with a measured load in the related art.

However, as illustrated in FIG. 1, in the related art, in order to determine whether an excessive load is applied to the tools, an apparatus and a method for detecting an abnormality of a tool of a machine tool detect and store a maximum load applied to the main shaft and stop the machining process by determining that the tool is abnormal only when a current load is higher than the maximum load during the machining process. As a result, there is a problem in that it is impossible to determine the abnormality of the tool in which a load lower than the maximum load occurs. In FIGS. 1, T1, T2, T3, T4, and T5 mean different tools.

That is, in the related art, the apparatus and the method for detecting an abnormality of the tool of the machine tool cannot detect the load equal to or higher than the maximum load when no load occurs even though the tool is completely broken or when the amount of change in load is small because the amount of damage to the tool is small. As a result, the machining process is not stopped even though the tool is abnormal, which causes a deterioration in machining precision and waste of workpieces.

Further, in the related art, the apparatus and the method for detecting an abnormality of the tool of the machine tool cannot accurately determine that the tool is abnormal, and as a result, there is a problem in that reliability and precision of the machine tool deteriorate.

In addition, in the related art, the apparatus and the method for detecting an abnormality of the tool of the machine tool are made without consideration of variables such as machining work, types of workpieces to be machined, types of machining tools, and the like, and the apparatus and the method for detecting an abnormality of the tool of the machine tool do not detect the abnormality of the tool in accordance with a load trend of the tool. As a result, an operator needs to consistently perform monitoring with the naked eye, which causes a problem in that the operator is inconvenienced, productivity deteriorates, and maintenance costs for the machine tool are increased.

DISCLOSURE

Summary

The present disclosure has been made in an effort to solve the above-mentioned problems, and an object of the present disclosure is to provide an apparatus and a method for detecting an abnormality of a tool of a machine tool, which are capable of repeatedly measuring a load of a workpiece transferring unit or a workpiece machining unit, and automatically detecting the presence or absence of an abnormality of a tool based on a normal range of load data that are proportional to a standard deviation of the load data measured based on a mode value of the repeatedly measured load data, thereby maximizing reliability and accuracy and preventing waste of resources.

Further, another object of the present disclosure is to provide an apparatus and a method for detecting an abnormality of a tool of a machine tool, which store the existing data in a determination data storage unit in accordance with the determination of an abnormality of a tool performed by a comparison unit and with the determination of completion of the workpiece machining performed by a determination unit, repeat the above-mentioned processes, and set an optimum normal range by utilizing the data as standard data, thereby achieving machine learning, improving a user's convenience, and reducing maintenance costs.

In order to achieve the objects of the present disclosure, an apparatus for detecting an abnormality of a tool of a machine tool according to the present disclosure may include: a workpiece transferring unit configured to transfer a workpiece; a workpiece machining unit configured to machine the workpiece by a tool; and a control unit, in which the control unit includes: a storage unit configured to store information for detecting presence or absence of an abnormality of the tool; a measurement unit configured to measure a load of the workpiece transferring unit or the workpiece machining unit; a calculation unit configured to calculate a normal range of the measured load data; and a comparison unit configured to detect the presence or absence of an abnormality of the tool by comparing the normal range of the load data calculated by the calculation unit and the data measured by the measurement unit.

Further, according to another exemplary embodiment of the apparatus for detecting an abnormality of the tool of the machine tool according to the present disclosure, the control unit of the apparatus for detecting an abnormality of the tool of the machine tool may repeatedly measure the load of the workpiece transferring unit or the workpiece machining unit and detect the presence or absence of an abnormality of the tool based on the normal range of the load data that are proportional to a standard deviation of the load data measured based on a mode value of the repeatedly measured load data.

In addition, according to another exemplary embodiment of the apparatus for detecting an abnormality of the tool of the machine tool according to the present disclosure, the control unit of the apparatus for detecting an abnormality of the tool of the machine tool may further include a determination unit configured to determine the result of determining the presence or absence of an abnormality by the comparison unit and whether workpiece machining is performed by the workpiece machining unit.

Further, according to another exemplary embodiment of the apparatus for detecting an abnormality of the tool of the machine tool according to the present disclosure, the calculation unit of the control unit of the apparatus for detecting an abnormality of the tool of the machine tool may include: a mode-value calculating unit configured to calculate a maximum mode value and a minimum mode value among the load data measured by the measurement unit; a standard-deviation calculating unit configured to calculate a standard deviation of the load data measured by the measurement unit; and a normal-range calculating unit configured to calculate a maximum normal range and a minimum normal range based on the data stored in the storage unit and values calculated by the mode-value calculating unit and the standard-deviation calculating unit.

In addition, according to another exemplary embodiment of the apparatus for detecting an abnormality of the tool of the machine tool according to the present disclosure, the storage unit of the control unit of the apparatus for detecting an abnormality of the tool of the machine tool may include a basic-data storing unit configured to store data of a maximum reference range, a minimum reference range, a maximum application ratio, and a minimum application ratio; a load-data storing unit configured to store the load data measured by the measurement unit; and a normal-range-data storing unit configured to store the maximum normal range and the minimum normal range calculated by the normal-range calculating unit.

Further, according to another exemplary embodiment of the apparatus for detecting an abnormality of the tool of the machine tool according to the present disclosure, the storage unit of the control unit of the apparatus for detecting an abnormality of the tool of the machine tool may further include a determination-data storing unit configured to store, as standard data, the data stored in the basic-data storing unit, the load-data storing unit, and the normal-range-data storing unit when workpiece machining is normally ended as a result of the determination of the determination unit.

In addition, according to another exemplary embodiment of the apparatus for detecting an abnormality of the tool of the machine tool according to the present disclosure, the apparatus for detecting an abnormality of the tool of the machine tool may further include: a tool-abnormality-detection-automatic-selection-function input unit of the control unit; and a display unit configured to display results of the comparison unit and the determination unit.

Further, according to another exemplary embodiment of the apparatus for detecting an abnormality of the tool of the machine tool according to the present disclosure, the calculation unit of the control unit of the apparatus for detecting an abnormality of the tool of the machine tool may calculate the normal range of the load data that are proportional to the standard deviation of the load data measured based on any one of a mode value, a mean value, and a median value of the measured load data.

In order to achieve another object of the present disclosure, a method of detecting an abnormality of a tool of a machine tool according to the present disclosure may include: storing basic data; measuring a load of a workpiece transferring unit or a workpiece machining unit; storing measured load data; calculating a maximum mode value and a minimum mode value based on the measured load data; calculating a maximum standard deviation and a minimum standard deviation based on the load data; calculating a maximum normal range and a minimum normal range based on the basic data, the maximum mode value, the minimum mode value, the maximum standard deviation, and the minimum standard deviation; storing the calculated normal range; comparing the real-time measured load data and the calculated normal range; and determining presence or absence of an abnormality of a tool and whether workpiece machining is performed by the workpiece machining unit.

Further, according to another exemplary embodiment of the method of detecting an abnormality of the tool of the machine tool according to the present disclosure, the method of detecting an abnormality of the tool of the machine tool may further include displaying that the measured load data deviates from the normal range when the measured load data deviates from the normal range after the comparing of the real-time measured load data and the calculated normal range.

In addition, according to another exemplary embodiment of the method of detecting an abnormality of the tool of the machine tool according to the present disclosure, the method of detecting an abnormality of the tool of the machine tool may further include storing the basic data, the load data, and the normal-range data as standard data when the workpiece machining is normally ended after the determining of the presence or absence of an abnormality of the tool and whether the workpiece machining is performed by the workpiece machining unit.

The apparatus and the method for detecting an abnormality of the tool of the machine tool according to the present disclosure may repeatedly measure the load of the workpiece transferring unit or the workpiece machining unit and detect the presence or absence of an abnormality of the tool based on the normal range of the load data that are proportional to the standard deviation of the load data measured based on the mode value of the repeatedly measured load data, thereby maximizing reliability and accuracy.

Further, the apparatus and the method for detecting an abnormality of the tool of the machine tool according to the present disclosure may maximize reliability and accuracy, thereby reducing maintenance costs for the machine tool and improving the user's convenience.

In addition, the apparatus and the method for detecting an abnormality of the tool of the machine tool according to the present disclosure store the existing data in the determination-data storage unit in accordance with the determination of an abnormality of the tool performed by the comparison unit and with the determination of completion of the workpiece machining performed by the determination unit, repeat the above-mentioned processes, and set an optimum normal range by utilizing the data as standard data, thereby achieving machine learning, minimizing the generation rate of defective products of the machine tool, and preventing waste of resources.

Furthermore, the apparatus and the method for detecting an abnormality of the tool of the machine tool according to the present disclosure accurately detect the presence or absence of an abnormality of the tool by the simple operation of the input unit, thereby reducing non-machining time and improving productivity of the machine tool.

DETAILED DESCRIPTION OF CERTAIN INVENTIVE EMBODIMENT

Hereinafter, an apparatus and a method for detecting an abnormality of a tool of a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
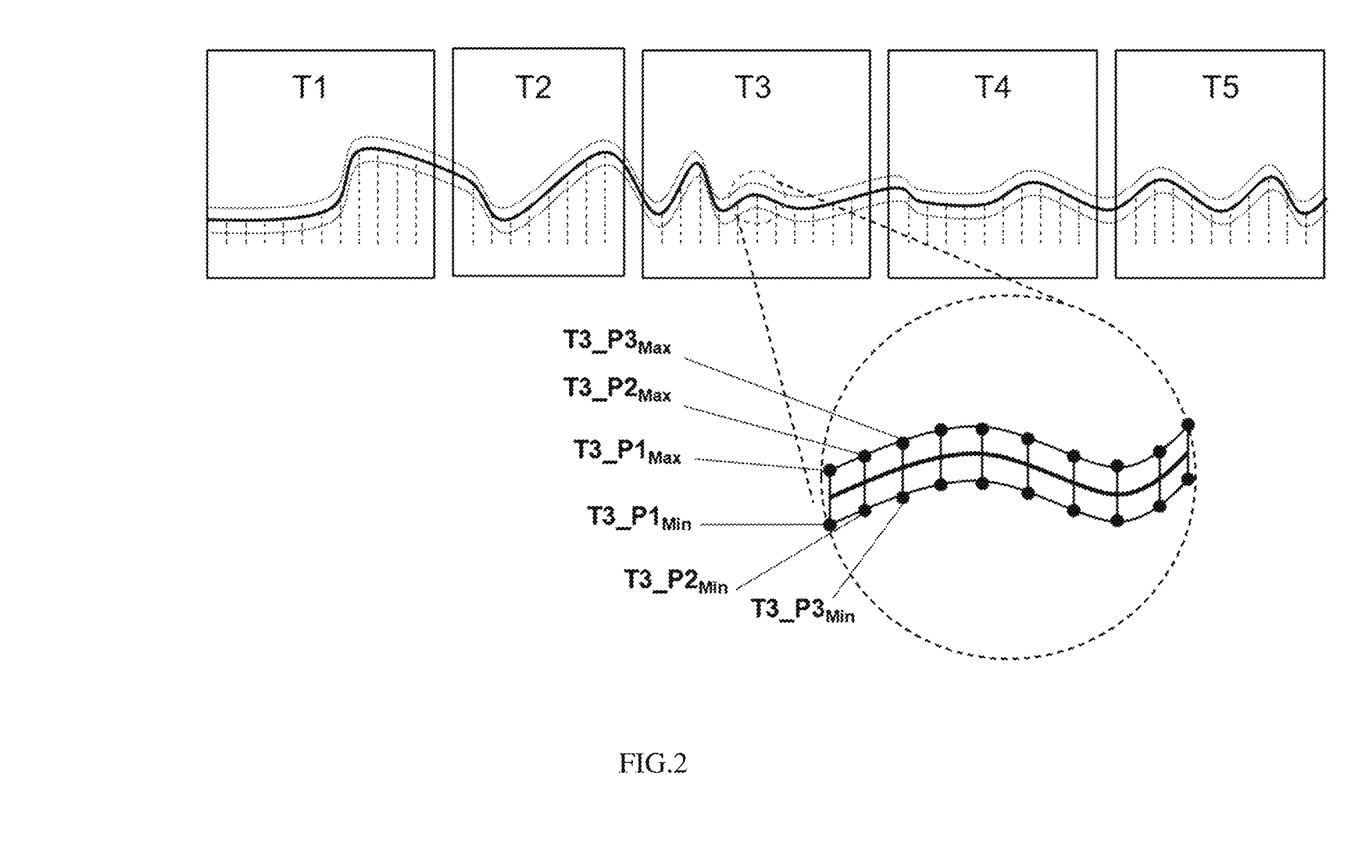
FIGS. 2 and 3 are graphs for explaining a method of calculating a normal range according to an exemplary embodiment of the present disclosure.
Figure 3:
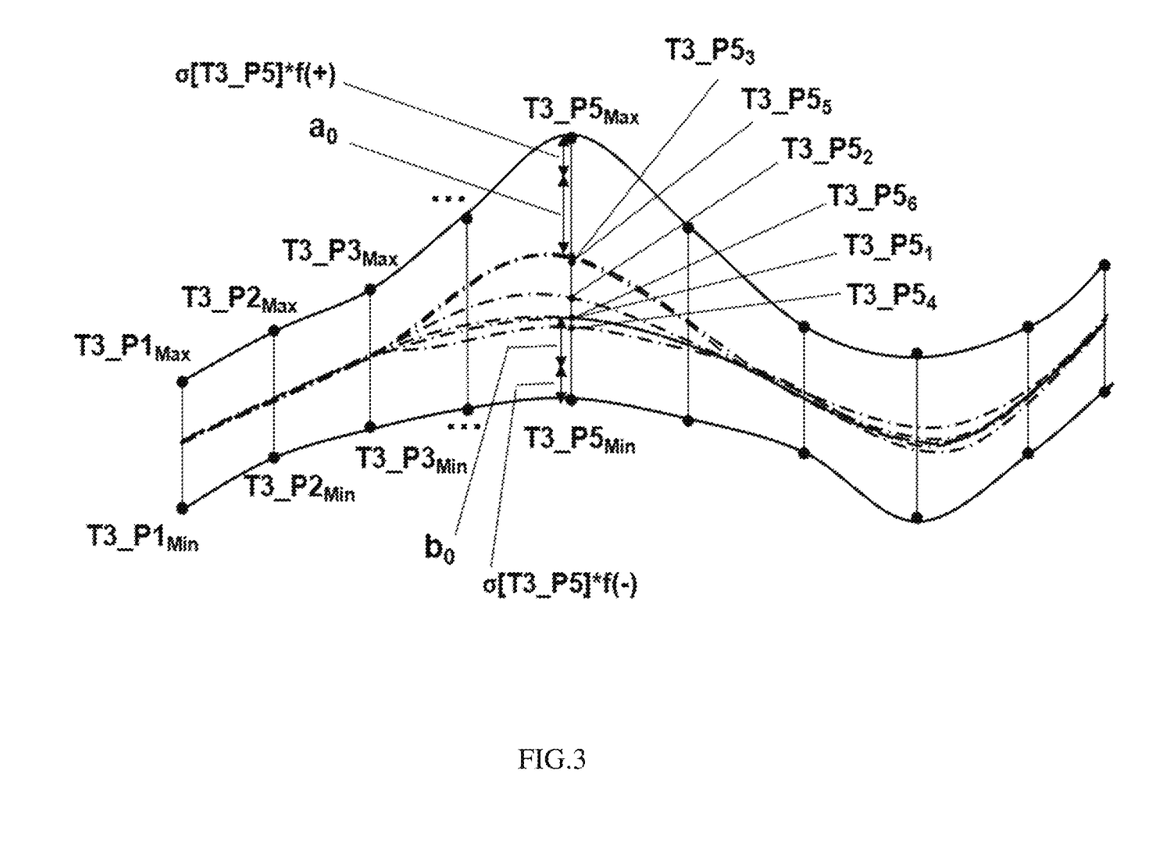
Figure 4:
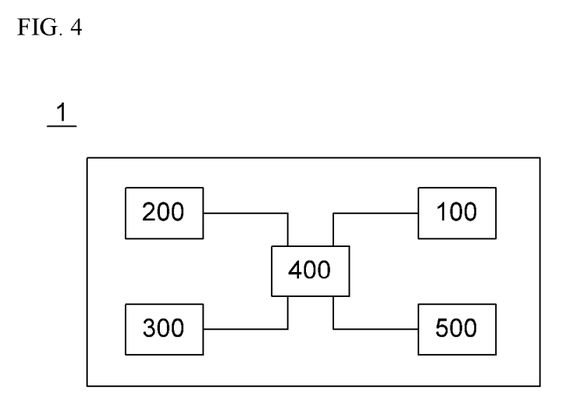
FIG. 4 is a block diagram illustrating a configuration of an apparatus for detecting an abnormality of a tool of a machine tool according to the exemplary embodiment of the present disclosure.
Figure 5:
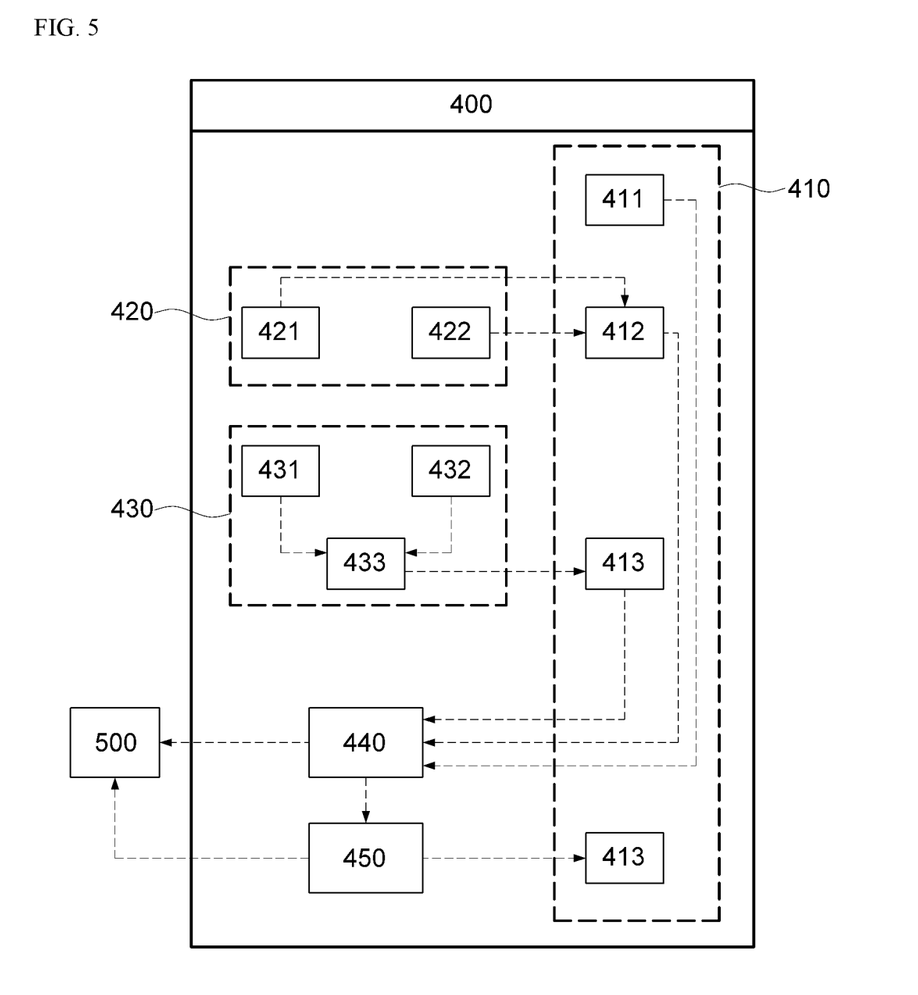
FIG. 5 is a block diagram illustrating a configuration of a control unit of the apparatus for detecting an abnormality of the tool of the machine tool according to the exemplary embodiment of the present disclosure.
Figure 6:
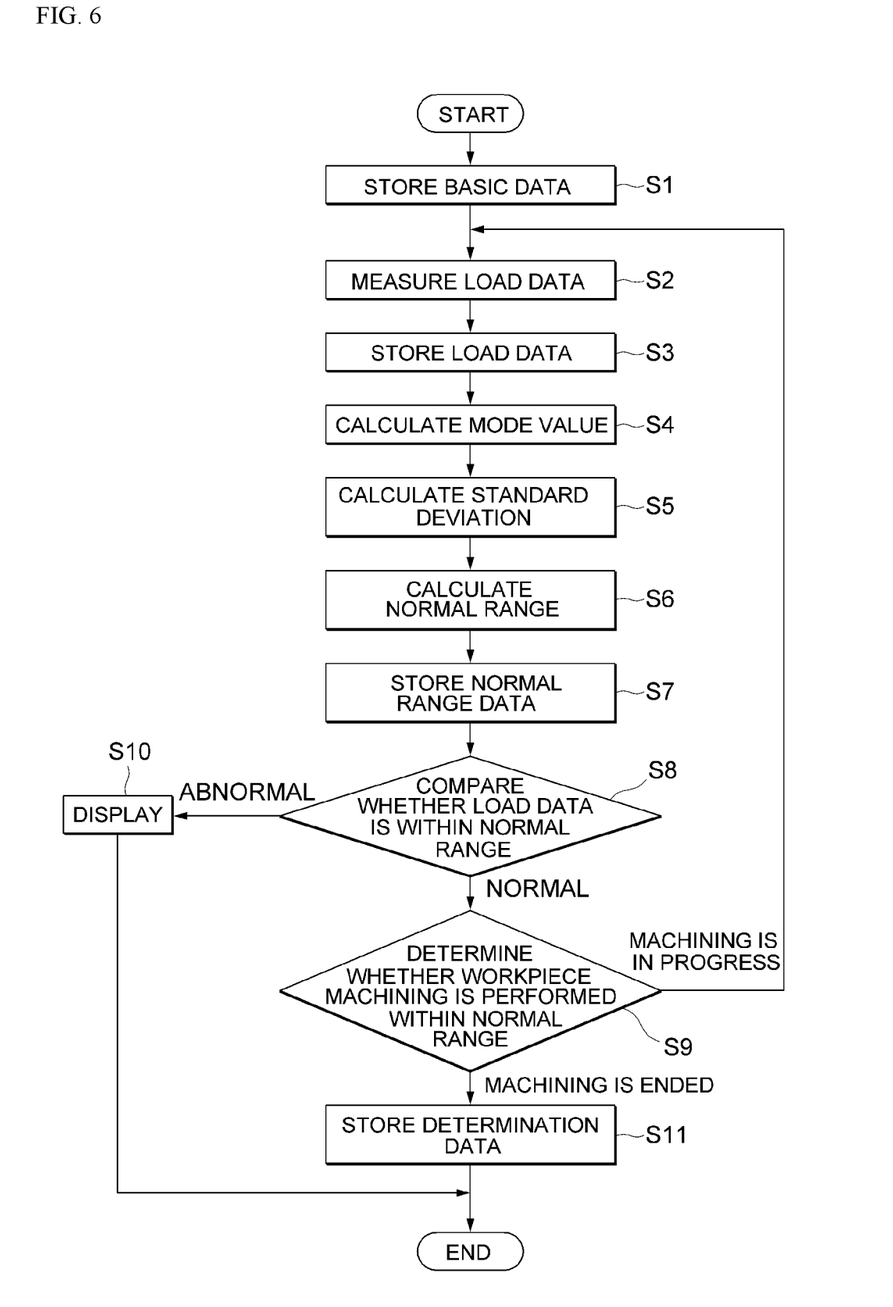
FIG. 6 is a flowchart illustrating a method of detecting an abnormality of a tool of a machine tool according to the exemplary embodiment of the present disclosure.

FIGS. 2 and 3 are graphs for explaining a method of calculating a normal range according to an exemplary embodiment of the present disclosure. FIG. 4 is a block diagram illustrating a configuration of an apparatus for detecting an abnormality of a tool of a machine tool according to the exemplary embodiment of the present disclosure, and FIG. 5 is a block diagram illustrating a configuration of a control unit of the apparatus for detecting an abnormality of the tool of the machine tool according to the exemplary embodiment of the present disclosure. FIG. 6 is a flowchart illustrating a method of detecting an abnormality of a tool of a machine tool according to the exemplary embodiment of the present disclosure.

An apparatus 1 for detecting an abnormality of a tool of a machine tool according to an exemplary embodiment of the present disclosure will be described with reference to FIGS. 2 to 5. As illustrated in FIGS. 4 and 5, the apparatus 1 for detecting an abnormality of the tool of the machine tool according to the exemplary embodiment of the present disclosure includes a workpiece transferring unit 200, a workpiece machining unit 300, and a control unit 400. In addition, as illustrated in FIG. 4, the apparatus 1 for detecting an abnormality of the tool of the machine tool according to the exemplary embodiment of the present disclosure may further include an input unit 100 and a display unit 500.

The input unit 100 is installed in the form of a switch, a touch button, or the like on a control panel and performs a tool-abnormality-detection-automatic-selection function of the control unit during the process of machining the workpiece.

That is, an operator may repeatedly measure a load of the workpiece transferring unit or the workpiece machining unit by the input unit 100 and may optionally select the tool-abnormality-detection-automatic-selection function based on a normal range of load data that are proportional to a standard deviation of the load data measured based on a mode value of the repeatedly measured load data. If the tool-abnormality-detection-automatic-selection function is not selected by the input unit 100, a function of detecting an abnormality of the machine tool is not performed.

As described above, the load of the workpiece transferring unit or the workpiece machining unit is repeatedly measured by the simple operation of the input unit, and the presence or absence of an abnormality of the tool is automatically detected based on the normal range of the load data that are proportional to the standard deviation of the load data measured based on the mode value of the repeatedly measured load data, thereby achieving the operator's convenience, reducing non-machining time, and thus improving productivity of the machine tool.

The workpiece transferring unit 200 transfers a workpiece. The workpiece transferring unit 200 serves to transfer a palette on which a workpiece is placed before the workpiece is machined or transfer a table or shelf on which a workpiece to be machined is seated, but the present disclosure is not necessarily limited thereto.

The workpiece transferring unit 200 includes a ball screw in order to convert a rotational motion into a rectilinear motion, but the present disclosure is not necessarily limited thereto. The ball screw includes a bearing which is in contact with the ball screw, a bearing housing which surrounds the bearing, and a power transmission part which rotates the ball screw. In addition, the power transmission part may include a motor, particularly, a servo motor. As necessary, the workpiece transferring unit 200 may include a rack and pinion mechanism, or the workpiece transferring unit may include a transfer shaft.

The workpiece machining unit 300 uses a tool to machine a workpiece with a desired shape. That is, the workpiece machining unit 300 uses a tool to cut a workpiece. The workpiece machining unit may be configured in various forms, such as a boring machine, a drilling machine, a milling machine, a shaving machine, a turret, an attachment, and the like, capable of machining workpieces. The workpiece machining unit 300 includes a spindle (main shaft) on which the tool is mounted, but the present disclosure is not necessarily limited thereto.

The control unit 400 may repeatedly measure the load of the workpiece transferring unit 200 or the workpiece machining unit 300, may detect the presence or absence of an abnormality of the tool based on the normal range of the load data that are proportional to the standard deviation of the load data measured based on the mode value of the repeatedly measured load data, and may stop the operation of the machine tool that machines the workpiece.

The display unit 500 displays the presence or absence of an abnormality of the tool and the measured load data by the control unit 400. Therefore, the operator may monitor, in real time, the presence or absence of an abnormality of the tool with the naked eye during the machining process, and may check, in real time, the load data.

Further, when a comparison unit 440 to be described below compares the normal range of the load data calculated by the calculation unit and the real-time measured data measured by the measurement unit and the real-time measured data are not within the normal range as a result of determination of the comparison unit 440, the display unit 500 displays an alarm to notify the operator of the abnormality of the machine tool, thereby facilitating the maintenance of the machine tool and minimizing damage to the workpiece. In this case, the alarm may be displayed on a monitor or indicated in the form of alarm sound or warning light.

The display unit 500 may include an LCD, LED, or PDP monitor or the like, but the present disclosure is not necessarily limited thereto.

Therefore, the apparatus for detecting an abnormality of the tool of the machine tool according to the present disclosure may repeatedly measure the load of the workpiece transferring unit or the workpiece machining unit and detect the presence or absence of an abnormality of the tool based on the normal range of the load data that are proportional to the standard deviation of the load data measured based on the mode value of the repeatedly measured load data, thereby maximizing reliability and accuracy.

Further, as illustrated in FIG. 5, the control unit 400 of the apparatus 1 for detecting an abnormality of the tool of the machine tool according to the present disclosure includes a storage unit 410, a measurement unit 420, a calculation unit 430, the comparison unit 440, and a determination unit 450.

The storage unit 410 stores information for detecting the presence or absence of an abnormality of the tool.

The measurement unit 420 measures the load of the workpiece transferring unit 200 or the workpiece machining unit 300 multiple times. According to the exemplary embodiment of the present disclosure, the measurement unit 420 includes, but not necessarily limited to, a workpiece-transferring-unit-load-data measuring unit 421 configured to measure a load of the workpiece transferring unit 200, and a workpiece-machining-unit-load-data measuring unit 422 configured to measure load data of the workpiece machining unit 300.

The workpiece-transferring-unit-load-data measuring unit 421 and the workpiece-machining-unit-load-data measuring unit 422 may measure the load data in various ways.

According to the exemplary embodiment of the present disclosure, the workpiece-transferring-unit-load-data measuring unit 421 and the workpiece-machining-unit-load-data measuring unit 422 may measure the load data of the workpiece transferring unit and the workpiece machining unit by using a load measuring sensor which is an external sensor.

Further, the load measuring sensor may measure a load applied to the transfer shaft of the workpiece transferring unit in a case in which a gear ratio is smaller than a predetermined ratio even though the load is applied to the main shaft of the machine tool during the process of machining the workpiece or the transfer shaft of the workpiece transferring unit is of a direct connection type or is connected to a gear.

If the gear ratio is large when the transfer shaft of the workpiece transferring unit is not of the direct connection type but is connected to the gear, the load data generated in the motor are inversely proportional to the square of the gear ratio of the gear to which the motor is connected, and as a result, the load data cannot be measured because the load data is similar in magnitude of noise.

According to another exemplary embodiment of the present disclosure, the workpiece-transferring-unit-load-data measuring unit 421 and the workpiece-machining-unit-load-data measuring unit 422 may measure the loads by detecting load electric current values of a main shaft motor and a servo motor by using a CNC controller.

The calculation unit 430 calculates the normal range of the load data measured by the measurement unit 420. In addition, the calculation unit 430 according to another exemplary embodiment of the present disclosure calculates the normal range of the load data that are proportional to the standard deviation of the load data measured based on any one of a mode value, a mean value, and a median value of the measured load data. In particular, the calculation unit 430 according to the exemplary embodiment of the present disclosure calculates the normal range of the load data that are proportional to the standard deviation of the load data measured based on the mode value of the load data measured by the measurement unit 420. As described above, since the calculation unit 430 may calculate the normal range of the load data that are proportional to the standard deviation of the load data measured based on any one of the mode value, the mean value, and the median value of the load data measured by the measurement unit 420, thereby maximizing reliability and accuracy, and thus reducing maintenance costs of the machine tool and improving the user's convenience.

The comparison unit 440 compares the normal range of the load data calculated by the calculation unit 430 and the load data measured in real time by the measurement unit, thereby detecting the presence or absence of an abnormality of the tool.

The determination unit 450 determines a state of the machine tool in accordance with the result of comparing the presence or absence of an abnormality by the comparison unit 440 and whether the workpiece machining is performed by the workpiece machining unit.

As described above, the apparatus for detecting an abnormality of the tool of the machine tool according to the present disclosure compares whether the machining is performed and the presence or absence of an abnormality of the tool in real time during the machining process, determines whether the machining is performed, and then performs in real time control and machining, such that the machining with less error in machining precision, such as precision machining or ultra-precision machining, is enabled by maximizing the machining precision, thereby improving reliability of the machine tool and increasing the sale and the export of the machine tools.

As illustrated in FIG. 5, the calculation unit 430 of the control unit 400 of the apparatus 1 for detecting an abnormality of the tool of the machine tool according to the exemplary embodiment of the present disclosure includes a mode-value calculating unit 431, a standard-deviation calculating unit 432, and a normal-range calculating unit 433.

The mode-value calculating unit 431 calculates a maximum mode value $MODE_{MAX}[T_X-P_X]$, a minimum mode value $MODE_{MIN}[T_X-P_X]$, and a minimum mode value of the plurality of load data measured by the measurement unit.

In this case, the maximum mode value $MODE_{MAX}[T_X-P_X]$ is calculated as a maximum value among a plurality of high-level mode values of the plurality of measured load data, and minimum mode value $MODE_{MIN}[T_X-P_X]$ is calculated as a minimum value among a plurality of low-level mode values of the plurality of measured load data. According to the exemplary embodiment of the present disclosure, in order to improve reliability in determining reference values of the normal range and the abnormality of the tool, the maximum mode value $MODE_{MAX}[T_X-P_X]$ is calculated as a maximum value among the three high-level mode values of the plurality of measured load data, and the minimum mode value $MODE_{MIN}[T_X-P_X]$ is calculated as a minimum value among the three low-level mode values of the plurality of measured load data, but the present disclosure is not necessarily limited thereto.

The standard-deviation calculating unit 432 calculates a standard deviation $\sigma[T_X-P_X]$ of the plurality of load data measured in real time by the measurement unit 420. The standard-deviation calculating unit 432 determines a value calculated by subtracting respective measured values from an average of the measured load data, squaring these values, summing up the squared values, dividing the summed value by the number of measurement times, and taking the square root of the value.

The normal-range calculating unit 433 calculates a maximum normal range (a) and a minimum normal range (b) based on data of a maximum reference range $a_0$, a minimum reference range $b_0$, a maximum application ratio $f(+)$, and a minimum application ratio $f(-)$ stored in a basic data storage unit 411 of the storage unit 410, the maximum mode value and the minimum mode value of the mode-value calculating unit 431, and the value calculated by the standard-deviation calculating unit 432.

The maximum normal range (a) and the minimum normal range (b) are finally calculated by the normal-range calculating unit 433, and the normal range value is stored in a normal-range-data storing unit 414 of the storage unit 410 which will be described below.

A calculation principle of the calculation unit 430 will be described with reference to FIGS. 2 and 3.

The workpiece-transferring-unit-data measuring unit 421 and/or the workpiece machining-unit-data measuring unit 422 of the measurement unit 420 measure a load with respect to a tool 3 multiple times. In this case, the load data are obtained as illustrated in FIG. 2.

As illustrated in FIG. 3, the measurement unit measures the load of the workpiece machining unit with respect to the tool 3 ten times, and the normal range of the load data, which are proportional to the standard deviation of the load data measured based on the mode value of the repeatedly measured load data, is calculated through the following Equation 1 (the maximum normal range (a)) and the following Equation 2 (the minimum normal range (b)).

$$\text{Maximum normal range } (a) = T_X - P_{XMAX} = MODE_{MAX}[T_X - P_X] + \sigma[T_X - P_X] \times f(+) + a_0 \quad \text{Equation 1}$$

Maximum mode value: $MODE_{MAX}[T_X-P_X]$
Standard deviation: $\sigma[T_X-P_X]$
Maximum application ratio: $f(+)$
Maximum reference range: $a_0$ $$\text{Minimum normal range } (b) = T_X - P_{XMAX} = MODE_{MIN}[T_X - P_X] - \sigma[T_X - P_X] \times f(-) + b_0 \quad \text{Equation 2}$$

Minimum mode value: $MODE_{MIN}[T_X-P_X]$
Standard deviation: $\sigma[T_X-P_X]$
Minimum application ratio: $f(-)$
Minimum reference range: $b_0$ As illustrated in FIG. 5, the storage unit 410 of the control unit 400 of the apparatus 1 for detecting an abnormality of the tool of the machine tool according to the exemplary embodiment of the present disclosure includes the basic-data storing unit 411, a load-data storing unit 412, and a normal-range-data storing unit 413. In addition, the storage unit 410 of the apparatus 1 for detecting an abnormality of the tool of the machine tool according to the exemplary embodiment of the present disclosure may further include a determination-data storing unit 414.

The basic-data storing unit 411 stores the data of the maximum reference range $a_0$, the minimum reference range $b_0$, the maximum application ratio $f(+)$, and the minimum application ratio f(−). As described above, the data of the maximum reference range $a_0$, the minimum reference range $b_0$, the maximum application ratio f(+), and the minimum application ratio f(−) may be stored in the form of lookup data inputted in advance in accordance with types and performances of workpieces and motors.

The load-data storing unit 412 stores the load data measured by the workpiece-transferring-unit-load-data measuring unit 421 and the workpiece-machining-unit-load-data measuring unit 422 of the measurement unit 420.

The normal-range-data storing unit 413 stores the maximum normal range (a) and the minimum normal range (b) calculated by the normal-range calculating unit 433.

When the workpiece machining is normally ended as a result of the determination by the determination unit in accordance with the presence or absence of an abnormality by the comparison unit and whether the workpiece machining is performed by the workpiece machining unit, the determination-data storing unit 414 stores, as standard data, the data stored in the basic-data storing unit 411, the load-data storing unit 412, and the normal-range-data storing unit 413, thereby achieving machine learning. When the determination-data storing unit 414 stores the data a predetermined number of times or more as described above, the data of the maximum reference range $a_0$, the minimum reference range $b_0$, the maximum application ratio f(+), and the minimum application ratio f(−) are automatically changed to optimized constants to adapt to the corresponding situation and applied to Equations 1 and 2 in order to calculate the maximum normal range and the minimum normal range.

As described above, the present disclosure does not merely compare the maximum value of the load data and the real-time load data, but applies a trend by measuring the plurality of load data, sets a maximum normal range and a minimum normal range that are proportional to the standard deviation of the load data based on the mode value by using the trend, determines, by the comparison unit, whether the real-time load data of the workpiece transferring unit or the workpiece machining unit are within the normal range, and detects the presence or absence of an abnormality, thereby maximizing reliability of the machine tool and improving machining precision of the machine tool. In addition, when the abnormality is detected as a result of the determination by the comparison unit, the alarm may be generated by the display unit to quickly notify the operator of the abnormality, thereby minimizing the generation rate of defective products of the machine tool and preventing waste of resources.

Further, in Equations 1 and 2, the maximum reference range, the minimum reference range, the maximum application ratio, and the minimum application ratio are constants stored in the reference-data storing unit, and the constants are utilized as the standard data by storing the existing data in the determination-data storing unit in accordance with the determination of an abnormality of the tool by the determination unit and the determination of completion of the workpiece machining by the comparison unit and by repeatedly performing the process, such that the constants are automatically changed by machine learning through the setting of the optimum normal range. Further, the big data are accumulated as the apparatus for detecting an abnormality of the tool of the machine tool according to the present disclosure is repeatedly operated, such that accuracy of the machine learning is further improved, and the optimum normal range is calculated, thereby further improving reliability of the machine tool, reducing non-machining time of the machine tool, and maximizing productivity.

A method of detecting an abnormality of a tool of a machine tool according to the exemplary embodiment of the present disclosure will be described with reference to FIG. 6. As illustrated in FIG. 6, the method of detecting an abnormality of the tool of the machine tool according to the exemplary embodiment of the present disclosure includes a basic-data storing step S1, a load-data measuring step S2, a load-data storing step S3, a mode-value calculating step S4, a standard-deviation calculating step S5, a normal-range calculating step S6, a normal-range-data storing step S7, a comparison step S8, and a determination step S9, and may further include a display step S10 or a determination-data storing step S11.

The data of the maximum reference range, the minimum reference range, the maximum application ratio, and the minimum application ratio are stored in the basic-data storing unit 411 of the storage unit 410.

After the basic-data storing step S1, the load data are repeatedly measured by the workpiece-transferring-unit-load-data measuring unit 421 and the workpiece-machining-unit-load-data measuring unit 422 of the measurement unit 420.

After the load-data measuring step S2, the load data measured by the measurement unit 420 are stored in the load-data storing unit 412 of the storage unit 410.

After the load-data storing step S3, based on the load data repeatedly measured by the mode-value calculating unit 431 of the calculation unit 430, the maximum mode value is calculated among the plurality of high-level mode values, and the minimum mode value is calculated among the plurality of low-level mode values.

That is, as described above, the maximum mode value $\text{MODE}_{MAX}[T_X-P_X]$ is calculated as a maximum value among a plurality of high-level mode values of the plurality of measured load data, and minimum mode value $\text{MODE}_{MIN}[T_X-P_X]$ is calculated as a minimum value among a plurality of low-level mode values of the plurality of measured load data. According to the exemplary embodiment of the present disclosure, in order to improve reliability in determining reference values of the normal range and the abnormality of the tool, the maximum mode value $\text{MODE}_{MAX}[T_X-P_X]$ is calculated as a maximum value among the three high-level mode values of the plurality of measured load data, and the minimum mode value $\text{MODE}_{MIN}[T_X-P_X]$ is calculated as a minimum value among the three low-level mode values of the plurality of measured load data, but the present disclosure is not necessarily limited thereto.

After the mode-value calculating step S4, the standard-deviation calculating unit 432 calculates a standard deviation $\sigma[T_X-P_X]$ of the plurality of load data measured in real time by the measurement unit 420. The standard-deviation calculating unit 432 calculates a value by subtracting respective measured values from an average of the measured load data, squaring these values, summing up the squared values, dividing the summed value by the number of measurement times, and taking the square root of the value.

After the standard-deviation calculating step S5, based on the above Equations 1 and 2, the normal-range calculating unit 433 calculates a maximum normal range (a) and a minimum normal range (b) based on data of a maximum reference range $a_0$, a minimum reference range $b_0$, a maximum application ratio f(+), and a minimum application ratio f(−) stored in a basic data storage unit 411 of the storage unit 410, the maximum mode value and the minimum mode value of the mode-value calculating unit 431, and the value calculated by the standard-deviation calculating unit 432.

After the normal-range calculating step S6, the maximum normal range (a) and the minimum normal range (b) are finally calculated by the normal-range calculating unit 433, and the normal range value is stored in a normal-range-data storing unit 414 of the storage unit 410.

After the normal-range-data storing step S7, the comparison unit 440 compares the load data measured in real time by the measurement unit 430 and the normal range data calculated by the normal-range calculating unit 433.

After the comparison step S8, when the load data measured in real time deviates from the normal range as a result of the comparison, it is determined that the tool is abnormal, and the display unit 500 displays the abnormality to warn the user of the abnormal state of the tool.

When the load data measured in real time is within the normal range as a result of the comparison, the determination unit 450 determines, once again, whether the workpiece machining is performed and whether the load data are within the normal range.

After the determination step S9, when the workpiece machining is in progress as a result of the determination, the process returns to the load-data measuring step, and the subsequent steps are repeated.

After the determination step S9, when the workpiece machining is normally ended as a result of the determination, the data, which are stored in the basic-data storing unit 411, the load-data storing unit 412, and the normal-range-data storing unit 413, are stored as the standard data, thereby achieving machine learning.

Therefore, the present disclosure repeatedly measures the load of the workpiece transferring unit or the workpiece machining unit, and automatically detects the presence or absence of an abnormality of the tool based on the normal range of the load data that are proportional to the standard deviation of the load data measured based on the mode value of the repeatedly measured load data, thereby improving reliability and accuracy. The present disclosure does not merely compare the maximum value of the load data and the real-time load data, but applies a trend by measuring the plurality of load data, sets a maximum normal range and a minimum normal range that are proportional to the standard deviation of the load data based on the mode value by using the trend, determines, by the comparison unit, whether the real-time load data of the workpiece transferring unit or the workpiece machining unit are within the normal range, and detects the presence or absence of an abnormality, thereby maximizing reliability and accuracy of the machine tool and improving machining precision of the machine tool. In addition, when the abnormality is detected as a result of the determination by the comparison unit, the alarm may be generated by the display unit to quickly notify the operator of the abnormality, thereby minimizing the generation rate of defective products of the machine tool and preventing waste of resources.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE NUMERALS OF DRAWINGS

1: Apparatus for detecting abnormality of tool of machine tool
100: Input unit
200: Workpiece transferring unit
300: Workpiece machining unit
400: Control unit
500: Display unit

The invention claimed is:

1. An apparatus for detecting an abnormality of a tool of a machine tool, the apparatus comprising:
a workpiece transferring member configured to transfer a workpiece;
a workpiece machining member configured to machine the workpiece by a tool, wherein the workpiece machining member comprises at least one of a boring machine, a drilling machine, a milling machine, a shaving machine, and a turret;
a controller, wherein the controller performs the following functions:
a data storage function configured to store information for detecting presence or absence of an abnormality of the tool;
a load measurement function configured to measure a load of the workpiece transferring member or the workpiece machining member;
a load calculation function configured to calculate a normal range of the measured load data; and
a data comparison function configured to detect the presence or absence of an abnormality of the tool by comparing the normal range of the load data calculated by the load calculation function and the data measured by the load measurement function;
wherein the controller repeatedly measures the load of the workpiece transferring member or the workpiece machining member and detects the presence or absence of an abnormality of the tool based on the normal range of the load data that are proportional to a standard deviation of the load data measured based on a mode value of the repeatedly measured load data and thereby improves reliability and accuracy of the machine tool, the normal range being calculated through the following Equation 1 and Equation 2:

$$\text{Maximum normal range } (a) = \text{MODE}_{MAX}[T_x - P_x] + \sigma[T_x - P_x] * f(+) + a_0, \quad \text{[Equation 1]}$$

wherein
$\text{MODE}_{MAX}[T_x - P_x]$ is a maximum mode value,
$\sigma[T_x - P_x]$ is a standard deviation,
$f(+)$ is a maximum application ratio, and
$a_0$ is a maximum reference range;

$$\text{Minimum normal range } (b) = \text{MODE}_{MIN}[T_x - P_x] - \sigma[T_x - P_x] * f(-) + b_0, \quad \text{[Equation 2]}$$

wherein
$\text{MODE}_{MIN}[T_x - P_x]$ is a minimum mode value,
$\sigma[T_x - P_x]$ is a standard deviation,
$f(-)$ is a minimum application ratio,
and $b_0$ is a minimum reference range;
wherein the controller further performs the following functions: a determination function configured to determine the result of determining the presence or absence of an abnormality by the data comparison function and whether workpiece machining is performed by the workpiece machining member;

wherein the load calculation function comprises: a mode-value calculating function configured to calculate the maximum mode value and the minimum mode value among the load data measured by the load measurement function; a standard-deviation calculating function configured to calculate the standard deviation of the load data measured by the load measurement function; and a normal-range calculating function configured to calculate the maximum normal range and the minimum normal range based on the data stored by the data storage function and the values calculated by the mode-value calculating function and the standard-deviation calculating function; and a display is configured to provide an alarm to notify an operator of the abnormality, thereby facilitating the maintenance of the machine tool.

2. The apparatus of claim 1, wherein the data storage function comprises:

a basic-data storing function configured to store data of a maximum reference range, a minimum reference range, a maximum application ratio, and a minimum application ratio;

a load-data storing function configured to store the load data measured by the load measurement function; and a normal-range-data storing function configured to store the maximum normal range and the minimum normal range calculated by the normal-range calculating function.

3. The apparatus of claim 2, wherein the data storage function further comprises:

a determination-data storing function configured to store, as standard data, the data stored by in the basic-data storing function, the load-data storing function, and the normal-range-data storing function when workpiece machining is normally ended as a result of the determination of the determination function.

4. The apparatus of claim 1, further comprising:

a tool-abnormality-detection-automatic-selection-function input member of the controller, comprising a switch or a touch button.

5. The apparatus of claim 1, wherein the load calculation function calculates the normal range of the load data that are proportional to the standard deviation of the load data measured based on any one of a mode value, a mean value, and a median value of the measured load data.

6. A method of detecting an abnormality of a tool of a machine tool, the method comprising:

storing basic data;

operating a workpiece transferring member or a workpiece machining member;

measuring a load of the workpiece transferring member or the workpiece machining member multiple times;

storing measured load data;

calculating a maximum mode value and a minimum mode value based on the measured load data;

calculating a standard deviation based on the load data;

calculating a maximum normal range and a minimum normal range based on the basic data, the maximum mode value, the minimum mode value, a maximum standard deviation, and a minimum standard deviation, the normal range being calculated through the following Equation 1 and Equation 2:

$$\text{Maximum normal range } (a) = \text{MODE}_{MAX}[T_x-P_x] + \sigma[T_x-P_x]*f(+) + a_0, \quad \text{[Equation 1]}$$

wherein $\text{MODE}_{MAX}[T_x-P_x]$ is a maximum mode value, $\sigma[T_x-P_x]$ is a standard deviation, $f(+)$ is a maximum application ratio, and $a_0$ is a maximum reference range;

$$\text{Minimum normal range } (b) = \text{MODE}_{MIN}[T_x-P_x] - \sigma[T_x-P_x]*f(-) + b_0, \quad \text{[Equation 2]}$$

wherein $\text{MODE}_{MIN}[T_x-P_x]$ is a minimum mode value, $\sigma[T_x-P_x]$ is a standard deviation, $f(-)$ is a minimum application ratio, and $b_0$ is a minimum reference range;

storing the calculated normal range; comparing the real-time measured load data and the calculated normal range;

determining presence or absence of an abnormality of a tool and whether workpiece machining is performed by the workpiece machining member; and providing an alarm to notify an operator of the abnormality, thereby facilitating the maintenance of the machine tool.

7. The method of claim 6, further comprising:

displaying that the measured load data deviates from the normal range when the measured load data deviates from the normal range after the comparing of the real-time measured load data and the calculated normal range.

8. The method of claim 6, further comprising:

storing the basic data, the load data, and the normal-range data as standard data when the workpiece machining is normally ended after the determining of the presence or absence of an abnormality of the tool and whether the workpiece machining is performed by the workpiece machining member.

* * * * *